United States Patent
Musti et al.

(10) Patent No.: US 10,666,749 B2
(45) Date of Patent: May 26, 2020

(54) SYSTEM AND METHOD OF LEVERAGING SIP TO INTEGRATE RFID TAG INFORMATION INTO PRESENCE DOCUMENTS

(75) Inventors: Subrahmanyam S. Musti, Tampa, FL (US); Sri Ramanathan, Lutz, FL (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1425 days.

(21) Appl. No.: 12/272,204

(22) Filed: Nov. 17, 2008

(65) Prior Publication Data

US 2010/0124236 A1 May 20, 2010

(51) Int. Cl.
*G06Q 30/02* (2012.01)
*H04L 29/08* (2006.01)
*H04W 4/029* (2018.01)
*H04L 29/06* (2006.01)

(52) U.S. Cl.
CPC ............ *H04L 67/24* (2013.01); *H04L 67/12* (2013.01); *H04W 4/029* (2018.02); *H04L 65/1006* (2013.01)

(58) Field of Classification Search
USPC ............ 340/825.49; 455/420; 705/14.58, 35; 370/271
See application file for complete search history.

(56) References Cited

U.S. PATENT DOCUMENTS

| | | | |
|---|---|---|---|
| 6,587,835 B1 | 7/2003 | Treyz et al. | |
| 6,859,831 B1 | 2/2005 | Gelvin et al. | |
| 7,127,261 B2 | 10/2006 | Van Erlach | |
| 7,319,397 B2 | 1/2008 | Chung et al. | |
| 7,822,659 B2 * | 10/2010 | Haakana | 705/35 |
| 7,843,857 B2 * | 11/2010 | Kim et al. | 370/271 |
| 2003/0048195 A1 * | 3/2003 | Trossen | 340/825.49 |
| 2003/0052788 A1 | 3/2003 | Chung | |
| 2004/0111364 A1 | 6/2004 | Haakana | |
| 2005/0065801 A1 * | 3/2005 | Poikselka et al. | 705/1 |
| 2005/0197062 A1 | 9/2005 | Sprogis | |
| 2005/0242167 A1 | 11/2005 | Kaario et al. | |
| 2006/0036485 A1 | 2/2006 | Duri et al. | |
| 2006/0126601 A1 | 6/2006 | Kim et al. | |

(Continued)

FOREIGN PATENT DOCUMENTS

| | | |
|---|---|---|
| EP | 1775909 | 4/2007 |
| EP | 1914973 | 4/2008 |

OTHER PUBLICATIONS

RFC 3261-SIP; Jun. 2002.*

*Primary Examiner* — Afaf Osman Bilal Ahmed
(74) *Attorney, Agent, or Firm* — James Nock; Andrew M. Calderon; Roberts Calderon Safran & Cole, P.C.

(57) ABSTRACT

A system and method is provided for converting RFID tag information into presence documents and, in particular, a system, topologies and a method is provided for leveraging session initiation protocol (SIP) to integrate RFID tag information into presence documents. The method is implemented in a computing environment, which includes receiving RFID information from a RFID gateway and converting the RFID information into a SIP message. The SIP message is published to a presence server.

22 Claims, 5 Drawing Sheets

(56) References Cited

U.S. PATENT DOCUMENTS

| | | |
|---|---|---|
| 2007/0080803 A1 | 4/2007 | Yang |
| 2007/0080808 A1 | 4/2007 | Hasegawa et al. |
| 2007/0222597 A1 | 9/2007 | Tourrilhes et al. |
| 2007/0268138 A1 | 11/2007 | Chung et al. |
| 2007/0293212 A1* | 12/2007 | Quon et al. .................. 455/420 |
| 2008/0039053 A1 | 2/2008 | Polozola et al. |
| 2010/0057571 A1* | 3/2010 | Yamamoto et al. ....... 705/14.58 |

* cited by examiner

SYSTEM AND METHOD OF LEVERAGING SIP TO INTEGRATE RFID TAG INFORMATION INTO PRESENCE DOCUMENTS

FIELD OF THE INVENTION

The invention generally relates to a system and method of converting RFID tag information into presence documents and, in particular, to a system, topologies and method of leveraging session initiation protocol (SIP) to integrate RFID tag information into presence documents.

BACKGROUND

Faced with an increasingly difficult challenge in growing both average revenue per user (ARPU) and numbers of subscribers, network carriers are trying to develop a host of new products, services, and business models based on data services. While a lot of advances have been made in the Value Added Services (VAS), much integration with existing systems still is needed in order to fully capitalize on existing technologies.

For example, wireless and other types of technology have become ubiquitous in today's daily life. These wireless technologies include cellular telephones, the Internet, wireless Internet access (WiFi), GPS and RFID technologies, to name a few. These technologies are used over a broad range of applications, including personal usage to consumer transactions, to entertainment to business to business applications. As such, these technologies have evolved over the years to become increasingly more important to business transactions, including retail transactions, etc.

For example, RFID technology is used to track merchandise throughout the supply chain, including the purchasing of merchandise by the consumer. GPS, on the other hand, is used for personal usage to find retail outlets, residential locations, etc. Likewise, WiFi is used to access the Internet from many different locations, for many different types of usages, including personal and business usage. This technology allows a user to conduct business regardless of their whereabouts, with the caveat that they are near a WiFi hub.

Many technologies have evolved in such a way that the combination of the technologies have provided a synergistic effect. This, as such, has increased the effectiveness and workability of the technology to such an extent that they play a critical role in business. As an illustrative example, the combination of the Internet and WiFi has made the Internet that much more accessible to a user, regardless of their location. This allows the user to conduct business transactions more efficiently, such as track inventory, purchase items and maintain contact with an array of business associates and colleagues.

However, there is a need to increase the synergistic effects of different technologies. By doing so, it would be possible to increase the ability and efficiency to transfer content, track inventories, provide content to user, etc. These synergistic effects can take the form of VAS, which can attract subscribers and thus increase revenue.

Accordingly, there exists a need in the art to overcome the deficiencies described hereinabove.

SUMMARY

In a first aspect of the invention, a method implemented in a computing environment comprises: receiving RFID information from a RFID gateway; converting the RFID information into a SIP message; and publishing the SIP message to a presence server.

In another aspect of the invention, a computer program product comprising a computer usable storage medium having readable program code tangibly embodied in the medium is provided. The computer program product comprises: first program instructions to receive RFID information; second program instructions to convert the RFID information to a SIP message; and third program instructions to send the SIP message to a presence server for publishing as a presence document.

In yet another aspect of the invention, a system is provided for converting RFID signals to SIP messages. The system comprises a gateway implemented on a computer infrastructure operable to convert RFID information into SIP based messaging for publication by a presence server.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
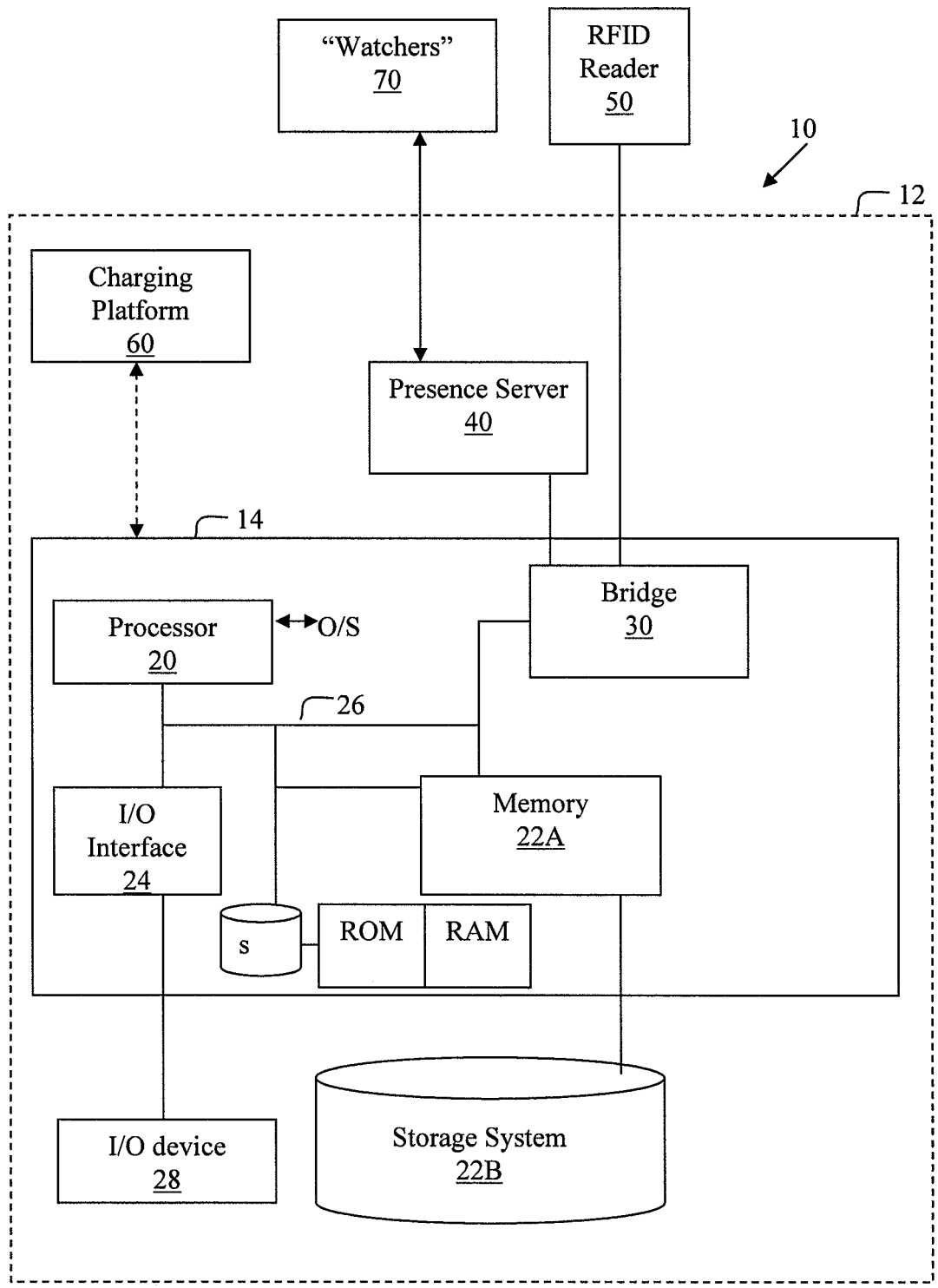
FIG. 1 shows an illustrative environment for implementing processes in accordance with the invention.

The invention generally relates to a system and method of converting RFID tag information into presence documents and, in particular, to a system, topologies and methods of leveraging session initiation protocol (SIP) to integrate RFID tag information into presence documents. In embodiments, the system, topologies and methods support both active and passive tag infrastructures, as well as accounting record integration. The system and exemplary topologies include a Bridge (also referred to as a gateway or integration device) that allows a low power RFID network to communicate bi-directionally to an IMS enabled telecommunications service provider network for the purposes of defining and rollout of different services. In embodiments, the RFID tag information can be integrated at the infrastructure level (compared to the tag level) into an existing wireless or wireline carrier network infrastructure using the Bridge in accordance with aspects of the invention. For example, the Bridge can convert RFID tag information into Session Initiated Protocol (SIP) message for publication and notification.

More specifically, in implementation, RFID originated events (e.g., RFID tag information) are converted into SIP messages for incorporation into an IP Multimedia Subsystem infrastructure. In this way, the RFID originated events can be integrated into a carrier based presence server to update a presence document. The integration of the RFID into a wireless or wireline telecommunications "network"

can be used for a variety of applications. For example, this allows third parties, e.g., "watchers", to track the location of items, people, events, etc. using the existing presence infrastructure of the telecommunications "network" in order to receive richer presence information. This, in turn, allows the "watchers" to provide location and subject based content to the user associated with the RFID tag information. The third parties can be content providers, advertisers and/or other types of service providers.

In embodiments, the Bridge provides bi-directional communications; that is, the Bridge can convert RFID signals into SIP, as well as receive notifications from the network. The topologies can be deployed as a carrier grade service plane enabler on which composite services can be built and deployed. The system can also be deployed to support an accounting model as part of a revenue generating carrier service. In embodiments, the present invention can be incorporated easily into existing presence peers (including clients) in order to receive the richer presence information.

In embodiments, the content can be any type of content (multimedia). The content can be, for example, audio, text, streaming video, graphics, etc., any of which is dynamically provided to the user and relevant to the location and subject of the RFID triggered event. The content can be sent to a plurality of different users based on their location, i.e., triggered by receipt of the RFID information. The content can also be sent to different devices such as, for example, a portable digital assistant (PDA), cellular telephone, laptop computer or any other type of mobile device.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server 12 that can perform the processes described herein. In particular, the server 12 includes a computing device 14. The computing device 14 can be resident on a carrier network infrastructure, content provider server, a standalone system or other third party service provider (any of which is generally represented in FIG. 1).

The computing device 14 includes a Bridge 30 (module or program control) configured to make the computing device 14 operable to perform the services described herein. The implementation of the Bridge 30 provides an efficient way in which a presence server 40 (e.g., network carrier, etc.) can receive RFID information from an RFID reader and, in turn, provide rich presence information to a watcher 70. In embodiments, the Bridge 30 can be one or more computing modules, and can be implemented by a service provider such as, for example, a network carrier, content provider, etc. By using this system and methodology, the network carrier will not have to make any significant infrastructure investments, as the preexisting infrastructure is utilized with the present invention. In embodiments, the Bridge 30 and the presence server 40 can be part of the Service Provider Domain, Enterprise Domain or a standalone system, in any combination.

By way of illustration, the Bridge 30 is configured to convert RFID signals into SIP based messages. More specifically, in implementation, the RFID signal is read by a RFID reader and provided to an RFID gateway, generally depicted at reference numeral 50. The RFID gateway 50 sends the RFID signal to the Bridge 30, which converts the RFID information into a SIP compliant notification that can be used by other components such as a presence server 40 to make valuable changes to a presence document. This allows for the integration of the RFID tag information into a presence document so that SIP based signaling can be leveraged effectively in environments where changes are rapid. Registered watchers 70 can thus avail themselves of valuable supporting information over and above basic availability on a given communication channel.

In embodiments, the SIP status is "Published" when it is received by the presence server 40 which, in turn, in addition to the "2000K" that is sent back to the notifying source, sends out a SIP Notification ("Notify") to all the entities (watchers) 70 that are registered to receive such notifications. These watchers 70 can be, for example, content providers, employers, handheld devices, or a host of other third parties. Thus, the presence server 40 in an IMS (IP Multimedia subsystem) enabled telecommunications network allows watchers 70 to monitor changes to presentities.

In embodiments, the common SIP message contains a "to", "from", "Subject", "CALL-ID", "contact", "content type" and "content length". In addition to these header components, the SIP message also contains a payload. The from, CALL-ID, contact, content-type and content length can all be generated by the SIP, e.g., presence server 40, but the "subject" and "to" fields require population from another device. The "subject" and "to" fields tells the presence server 40 to whom the message is to be sent, e.g., what watcher 70, and the subject matter of the message. One way to accomplish this is by embedding the "subject" and "to" components in the RFID. The payload information can also be embedded into the RFID.

In one contemplated embodiment, a JSON (JavaScript Object Notation) format is used to construct a text message that can be published. The JSON is a lightweight data-interchange format, which is easy for humans to read and write and for machines to parse and generate. By way of one illustrative non-limiting example, the JSON format can be:

{To:matt@domain.com;Subject:Jacket;Payload: 112155352224;}

As shown in the above example, the JSON format includes the "to", "subject" and "payload" information. In embodiments, the "to", "subject" and "payload" information can be obtained by the RFID gateway 50. Alternatively, the Bridge 30 can obtain these components by use of a look up table. In either scenario, the RFID information can include certain information such as, for example, a tag ID. Using this information, the Bridge 30 or RFID gateway 50 can look-up pertinent information relating to the tag ID in an HSS (Home Subscriber Server) or storage system 22B. For example, in such a look-up, the tag ID can be correlated to the user name and ID, the content or event that is tagged by the RFID event and payload information, amongst other profile information.

In embodiments, the JSON format allows the Bridge 30 to fill in the required fields on where the message should be delivered, but exposes the RFID in a simple way that allows easy integration to a UI, like a web browser. The RFID payload can be encrypted and decrypted if necessary. It should be understood by those of skill in the art that other formats can also be contemplated by the invention as should already be known to those of skill in the art. For example, a simple text message can be converted into a SIP format.

Once an RFID scanner transmits the RFID information, e.g., payload, via the RFID gateway 50, the Gateway to SIP transformation takes the information provided by the tag and combines it with information stored in the Bridge 30 to form a SIP header and payload. The Bridge 30 can obtain information stored from the storage system 22B or an HSS, including the payload information.

There are many contemplated methods of converting the RFID tag information to a SIP based message. By way of example, the converted message can include:

```
PUBLISH
Via: SIP/2.0/UDP go.com:6060
From: <sip:UserA@go.com>
To: sip:matt@domain.com
Call-ID 2202020@go.com
Subject: Jacket
Contact: sip:userA@go.com
Content-type: text
Content length: 12
```

In the example above, the message includes all relevant information of the subject and payload, as well as the contact information (watcher information), content type and content length. Realizing that the above is only an illustrative example of the published message, it should be realized by those of skill in the art that other content, e.g., multimedia, content lengths, subjects and parties to this transmission are contemplated by the invention. The message can also be published to a publish queue, or overridden and sent to an address specified by the user.

This information can be combined with other presence information, obtained from GPS, A-GPS or triangulation methodologies to provide richer presence information to a "watcher". The presence information may be obtained from a location based service (LBS), e.g., a network carrier infrastructure, well known to those of skill in the art.

In embodiments, a charging platform 60 is maintained to provide charging models to charge for services rendered. The charging platform 60 may be maintained, deployed, created and/or serviced by the service provider. The charging platform 60 is designed to generate a charging record for services rendered to a subscriber. In embodiments, the service provider can calculate an amount to be charged, based on many different considerations and generate the charging record to be sent to the charging platform 60. In turn, the charging platform 60 can generate an invoice and/or deduct a usage charge from an account of the subscriber.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a keyboard, mouse, handheld device, etc.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. The participants may be, for example, a user of a mobile device. In return, the service provider can receive payment from the customer(s) and/or participants under a subscription and/or fee agreement and/or the service provider can receive payment from the sale of advertising content to one or more third parties.

Exemplary Topologies

Figure 2:
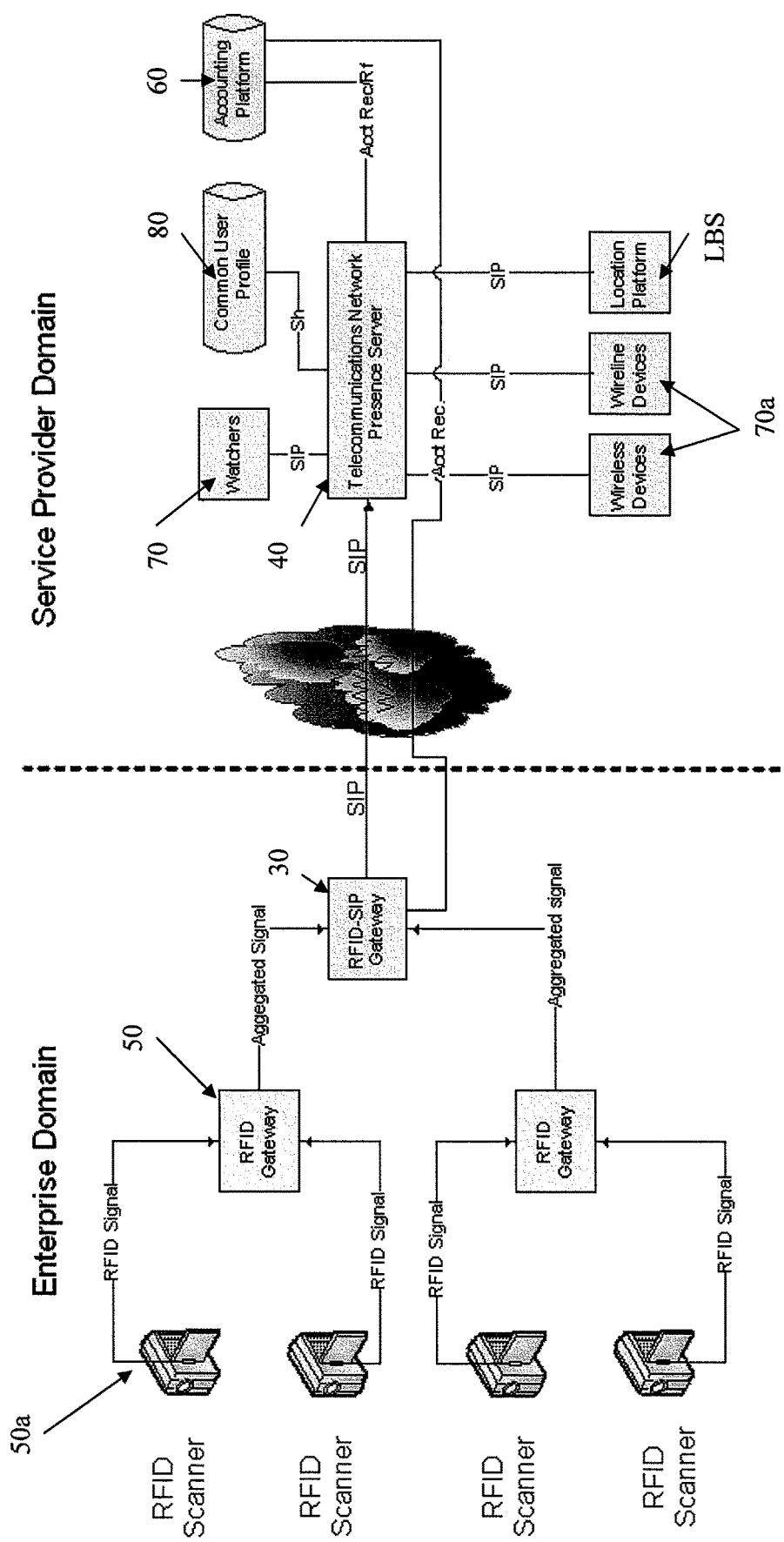
FIG. 2 shows a representative centralized topology for integrating RFID technology with presence information in accordance with aspects of the present invention.
Figure 3:
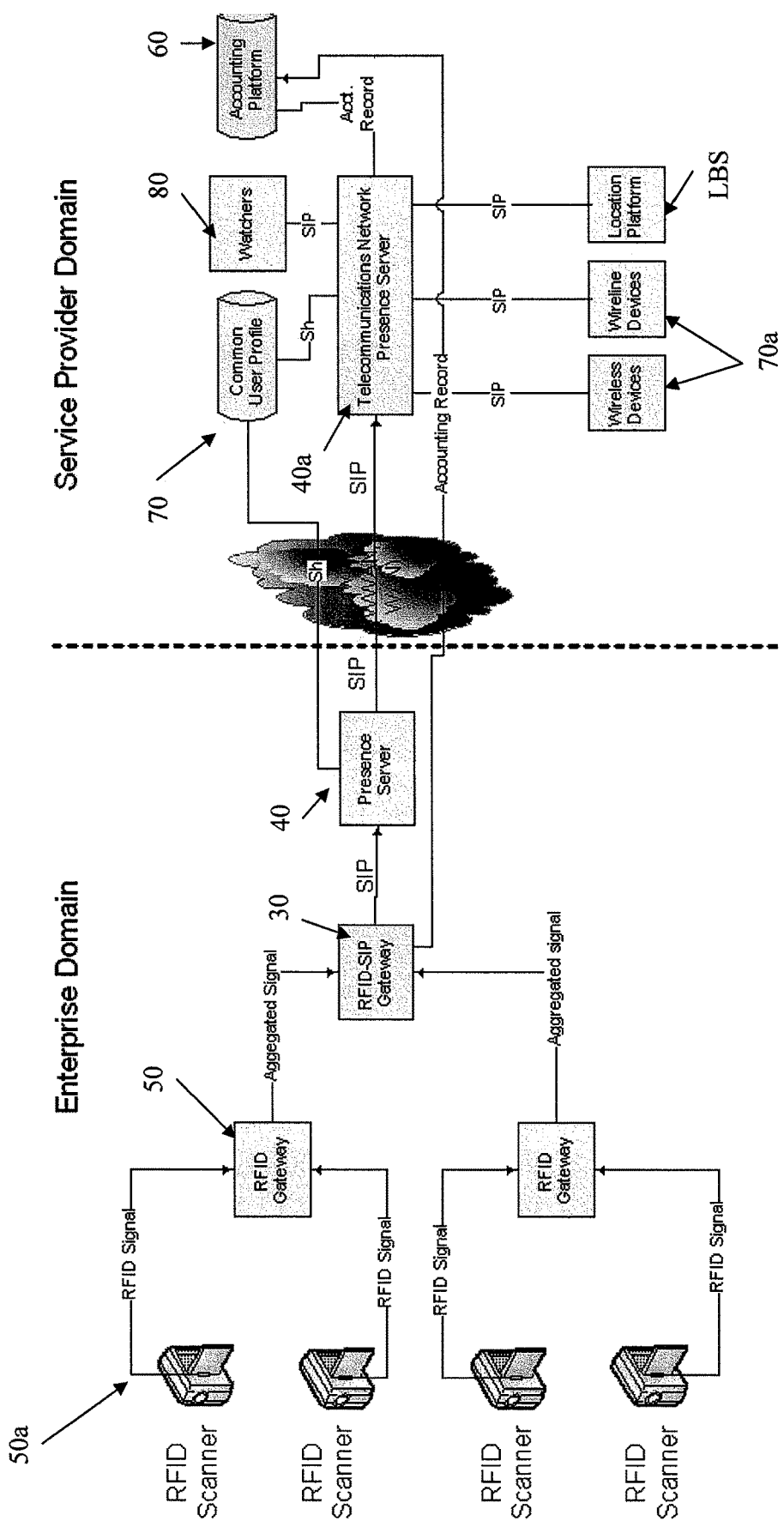
FIG. 3 shows a representative federated topology for integrating RFID technology with presence information in accordance with aspects of the present invention.
Figure 4:
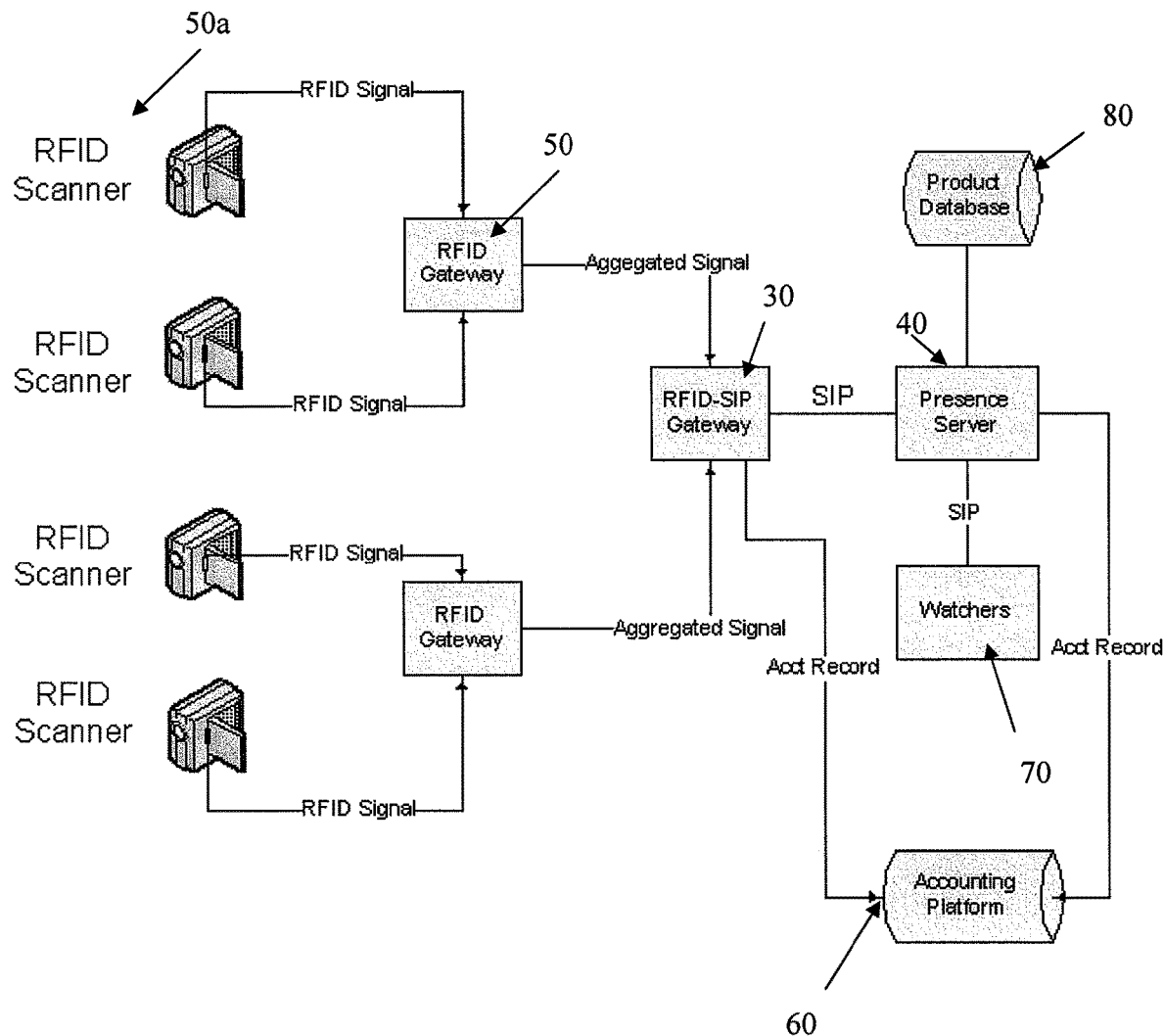
FIG. 4 shows a representative standalone topology for integrating RFID technology with presence information in accordance with aspects of the present invention.

In embodiments, several different topologies are contemplated by the invention. In particular, each of these topologies uses a gateway (Bridge) that converts RFID based notifications into SIP based notifications which are then used to update specific presence documents. For example, FIG. 2 shows a centralized topology in which one logical instance of a presence server is maintained in the Service Provider Domain. In FIG. 3, the enterprise deployment includes a presence server which acts in a federation model to a service provider housed central presence server. In FIG. 4, a standalone deployment topology is depicted.

More specifically, in FIG. 2, a plurality of RFID scanners 50a and RFID gateways 50 are provided in the Enterprise Domain. The RFID scanners 50a can be provided in a plurality of locations, configured to read RFID information associated with items, events, etc., either passively or actively. The RFID scanners 50a provide RFID signals to the RFID gateways 50. In embodiments, the RFID signals can include, for example, payload information, as well as ID information and other information as discussed above. The RFID gateways and scanners can be combined into a single component, both in the Enterprise Domain.

In embodiments, the RFID gateways 50 provide the aggregated signals to the RFID SIP gateway 30 (e.g., Bridge), also in the Enterprise Domain. The RFID SIP gateway 30 functions as a proxy to a standard UA (User Agent). The RFID SIP gateway 30 converts the RFID signal to a SIP message. The SIP message is then transmitted to the presence server 40, in the Service Provider Domain.

In the Service Provider Domain, the presence server 40 (which may be resident on the telecommunications network) can obtain information from a common user profile 80 such as an HSS. The common user profile can be any storage system such as the storage system 22B described with reference to FIG. 1. In embodiments, the HSS is a master user database that supports the IMS network entities that actually handle calls. In embodiments, the HSS contains subscription-related information (user profiles), performs authentication and authorization of the user, and can provide information about the user's physical location. The presence server 40 can also obtain location based information of the user from a location platform (LBS). Once all of the pertinent information is received at the presence server 40, a SIP notification can be provided to watchers 70 and/or other handheld devices 70a, e.g., other watchers. The SIP notification can include rich presence documents, which may include the RFID information in addition to location information of the event or item associated with the RFID.

An accounting or charging platform 60 is also provided in the Service Provider Domain. The charging platform 60 can receive registration and service provided information from the presence server 40 and the RFID SIP gateway 30. Using this information, the charging platform 60 can generate an invoice and/or deduct a usage charge from an account of the subscriber.

In FIG. 3, the Enterprise Deployment includes a presence server 40, which acts in a federation model to a service provider housed central presence server. More specifically, in FIG. 3, a plurality of RFID scanners 50a and RFID gateways 50 are provided in the Enterprise Domain. Much like in the centralized topology of FIG. 2, the RFID scanners 50a can be provided in a plurality of locations, configured to read RFID information associated with items, events, etc., either passively or actively. The RFID scanners 50a provide the RFID signals to the RFID gateways 50, as discussed above. The RFID gateways and scanners can be combined into a single component, both in the Enterprise Domain.

In embodiments, the RFID gateways 50 provide the aggregated signals to the RFID SIP gateway 30 (e.g., Bridge), also in the Enterprise Domain. Similar to that discussed with reference to FIG. 2, the RFID SIP gateway 30 converts the RFID signal to a SIP message. The SIP message is then transmitted to the presence server 40, in the Enterprise Domain. This allows for any value added processing and aggregation to more effectively occur inside the Enterprise Domain, allowing only filtered messages to go to the service provider domain.

The presence server 40 can obtain information from a common user profile 80 such an HSS in the Service Provider Domain. The common user profile can be any storage system such as the storage system 22B described with reference to FIG. 1.

The presence server 40 provides a SIP message to the telecommunications network 40a, which is located in the Service Provider Domain. The telecommunications network 40a may also include a presence server. The presence server of the telecommunications network 40a can obtain location based information of the user from the LBS in the Service Provider Domain. Alternatively, the presence server 40 can obtain the location based information directly from the LBS. Once all of the pertinent information is received at the presence server 40, a SIP notification can be provided to watchers 70 and/or other handheld devices 70*a*, e.g., other watchers, in the Service Provider Domain. The SIP notification can be provided directly from the telecommunications network 40*a* or the presence server 40.

The accounting or charging platform 60 is also provided in the Service Provider Domain. The charging platform 60 can receive registration and service provided information from the telecommunications network 40*a* (or presence server 40) and the RFID SIP gateway 30. Using this information, the charging platform can 60 can generate an invoice and/or deduct a usage charge from an account of the subscriber.

In FIG. 3, a standalone deployment topology is shown in accordance to aspects of the invention. In this example, there is no connectivity to a service provider platform and instead the entire infrastructure is housed and deployment in the Enterprise Domain.

Exemplary Processes

Figure 5:
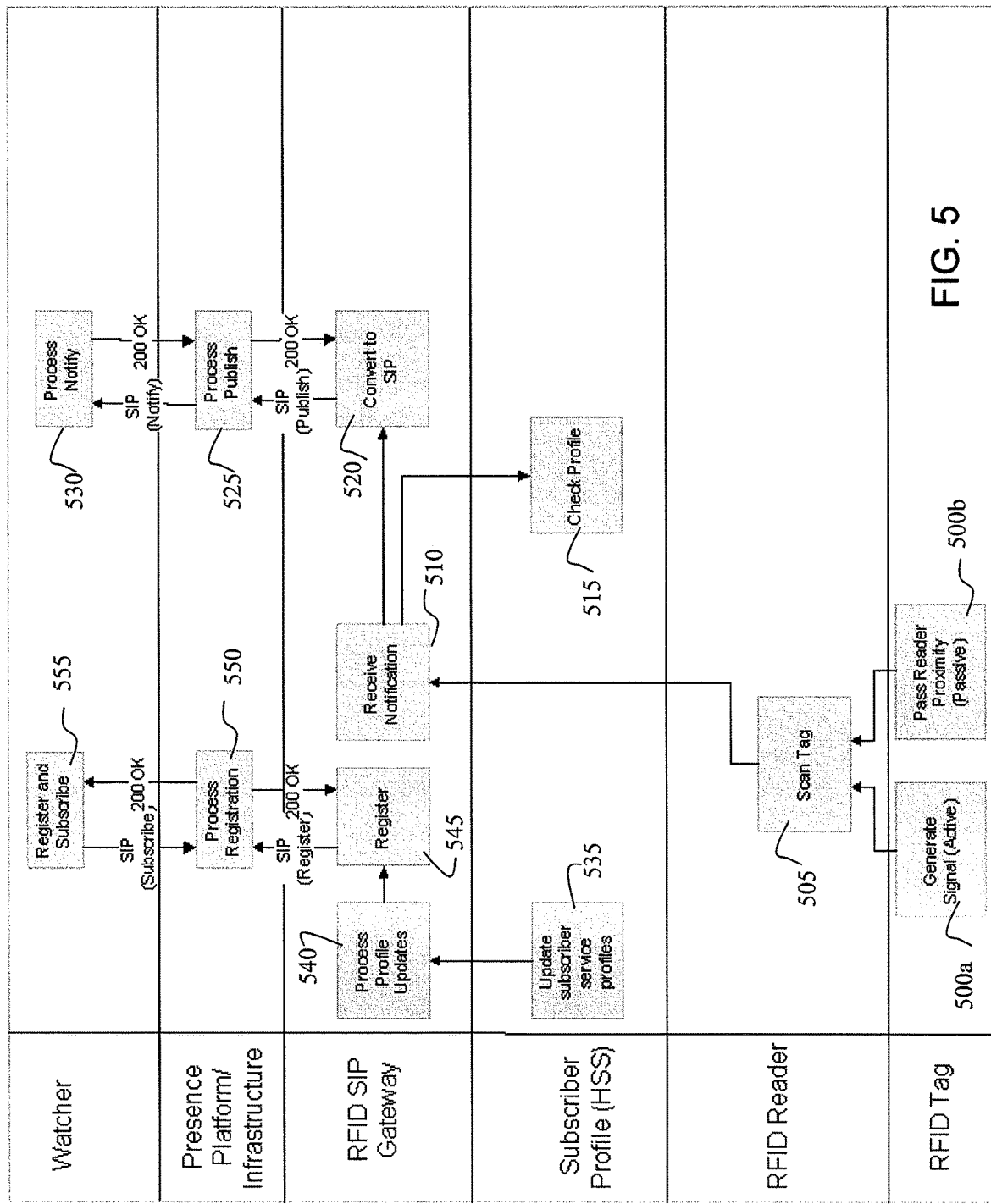
FIG. 5 is a swim lane (flow) diagram showing processes in accordance with aspects of the present invention.

FIG. 5 illustrates exemplary processes in accordance with the present invention. The steps of FIG. 5 may be implemented on the computer infrastructure or topologies of FIGS. 1-4, for example. The swim lane (flow) diagram in FIG. 5 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagram, and combination of the flow diagram can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the infrastructure or topologies of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

More specifically, FIG. 5 is a swim lane diagram showing different "players" and respective processing in accordance with aspects of the present invention. In FIG. 5, the players include: RFID tag, RFID reader, HSS, RFID SIP gateway, presence platform and watcher. Although FIG. 5 is implemented using the topology of FIG. 4, those of skill in the art should recognize that the swim lane diagram can be implemented in any of the described topologies.

At step 500*a*, the RFID tag generates an active signal to be read by an RFID reader at step 505. Alternatively, at step 500*b*, the RFID tag has a passive signal which is read by the RFID reader when in the proximity of the RFID reader. At step 510, the RFID SIP gateway receives the RFID information and, at step 515, checks a profile in the HSS. The profile lookup may be used to determine how to process the event. The RFID SIP gateway receives and updates the profile and, at step 520, converts the RFID information to a SIP message. At step 525, the SIP message is published to a presence platform, at which time a 200 OK signal is sent back to the RFID SIP gateway. In embodiments, the payload of the "publish" contains the event information from the RFID reader. At step 525, a SIP notification is sent to an appropriate registered watcher, which returns a 200 OK signal to the presence platform.

In embodiments, at step 535, the HSS is updated with subscriber service profile. More specifically, in this step, the RFID gateway receives profile updates from the HSS or an equivalent subscriber profile repository. In addition, at step 540, the RFID SIP Gateway registers with the SIP registrar in the network. Other watchers that want to participate in the system also subscribe to receive notifications from the presence server at steps 550 and 555.

Accordingly, the present invention is capable of providing a seamless mechanism for the conversion of RFID event information into SIP messages. Both passive and active tags are supported by the invention. The present invention can leverage presence documents (e.g., XML documents) to store RFID generated information as a part of the presentity. A non-presentity based approach is also supported, wherein the presence documents are loosely aggregated as collections associated with a group (XCAP via an XDMS).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method for tracking a location of people or items having Radio-Frequency Identification (RFID) tags, implemented in a computing environment, comprising:
receiving RFID signals, including radio-frequency identification (RFID) information pertaining to the people or items having the RFID tags, from a RFID gateway coupled to receive the RFID signals from RFID scanners configured to scan the RFID tags, wherein the RFID information includes a tag identification and "to", "subject", and "payload" information that are embedded in the RFID;
looking up profile information associated with the RFID information, in a storage system, based on the tag identification, wherein the profile information includes content and/or information regarding an event pertaining to the people or items having the RFID tags;
determining, by the processor, how to process the content and/or the event associated with the RFID information based on the profile information associated with the RFID information;
converting, by the processor, the RFID information and the profile information into a Session Initiation Protocol (SIP) message comprising the RFID information and the profile information after determining how to process the content and/or event associated with the RFID information;
publishing the SIP message to a presence server;
receiving one or more subscriber profile updates of one or more subscribers which are subscribed to receive the SIP message from the presence server, from the storage system;
obtaining location information pertaining to the people or items having the RFID tags from a location platform and placing the location information into a presence document with the RFID information to create a rich content presence document; and
sending the SIP message, with the rich content presence document, by the presence server to watchers that are subscribed to receive the SIP message.

2. The method of claim 1, further comprising sending the SIP message to a telecommunications network.

3. The method of claim 1, further comprising filling required fields in the SIP message prior to publishing using a JavaScript Object Notation (JSON) format.

4. The method of claim 1, further comprising updating a repository with a subscriber service profile.

5. The method of claim 4, wherein the updating includes an RFID SIP gateway receiving the subscriber profile updates from a subscriber profile repository.

6. The method of claim 5, wherein the RFID SIP gateway registers with a SIP registrar in a telecommunications network.

7. The method of claim 1, wherein:
the SIP message contains "to", "from", "Subject", "CALL-ID", "contact", "content type" and "content length" fields;
the "from", "CALL-ID", "contact", "content-type" and "content length" fields are generated by the presence server; and
the "subject" and "to" fields are populated by another device.

8. The method of claim 1, wherein the steps are provided on a computing infrastructure in the computing environment which is at least one of maintained, deployed, created and supported by a service provider.

9. The method of claim 1, wherein the steps are performed on at least one computer device comprising the processor.

10. The method of claim 1, further comprising charging a registrant for a notification of the SIP message.

11. A computer program product for tracking a location of people or items having Radio-Frequency Identification (RFID) tags, comprising a computer usable storage medium having readable program code tangibly embodied in the storage medium, the computer program product comprising:
first program instructions to receive RFID signals pertaining to the people or items having the RFID tags, including radio-frequency identification (RFID) information, from a RFID gateway coupled to receive the RFID signals from RFID scanners configured to scan the RFID tags wherein the RFID information includes a tag identification and "to", "subject", and "payload" information that are embedded in the RFID;
second program instructions to look up profile information associated with the RFID information, in a storage system, based on the tag identification, wherein the profile information includes content and/or information regarding an event pertaining to the people or items having the RFID tags;
third program instructions to determine how to process the content and/or the event associated with the RFID information based on the profile information associated with the RFID information;
fourth program instructions to convert the RFID information and the profile information to a Session Initiation Protocol (SIP) message comprising the RFID information and the profile information after determining how to process the content and/or event associated with the RFID information;
fifth program instructions to send the SIP message to a presence server for publishing as a presence document;
sixth program instructions to receive one or more subscriber profile updates of one or more subscribers which are subscribed to receive the SIP message from the presence server, from the storage system;
sixth program instructions to obtain location information pertaining to the people or items having the RFID tags from a location platform and placing the location information into a presence document with the RFID information to create a rich content presence document; and
seventh program instructions to send the SIP message, with the rich content presence document, by the presence server to watchers that are subscribed to receive the SIP message.

12. The computer program product of claim 11, further comprising eighth program instructions to notify third parties of the presence document.

13. The computer program product of claim 11, wherein:
the SIP message contains "to", "from", "Subject", "CALL-ID", "contact", "content type" and "content length" fields;
the "from", "CALL-ID", "contact", "content-type" and "content length" fields are generated by the presence server; and
the "subject" and "to" fields are populated by another device.

14. The computer program product of claim 11, wherein the computer program product is at least one of maintained, deployed, created and supported by a service provider.

15. The computer program product of claim 11, further comprising eighth program instructions to charge a user for notification of the presence document.

16. The computer program product of claim 11, further comprising eighth program instructions to obtain location information from a location platform and update the presence document with the location information to create a rich content presence document having the RFID information.

17. The computer program product of claim 11, further comprising eighth program instructions to register users to receive the presence document.

18. A system for tracking a location of people or items having radio-frequency identification (RFID) tags, comprising:
  a computer infrastructure operable to:
    receive RFID signals, including RFID information pertaining to the people or items having the RFID tags from a RFID gateway coupled to receive the RFID signals from RFID scanners configured to scan the RFID tags, wherein the RFID information includes a tag identification and "to", "subject", and "payload" information that are embedded in the RFID;
    look up profile information associated with the RFID information, in a storage system, based on the tag identification, wherein the profile information includes content and/or information regarding an event pertaining to the people or items having the RFID tags;
    convert the RFID information and the profile information into SIP based messaging comprising the RFID information and the profile information, for publication by a presence server after determining how to process the content and/or event associated with the RFID information;
    receive one or more subscriber profile updates of one or more subscribers which are subscribed to receive the SIP based messaging from the presence server, from the storage system;
    obtain location information pertaining to the people or items having the RFID tags from a location platform and placing the location information into a presence document with the RFID information to create a rich content presence document; and
    send the SIP message with the rich content presence document, by the presence server to watchers that are subscribed to receive the SIP message.

19. The system of claim 18, further comprising the gateway and the presence server in an enterprise domain.

20. The method of claim 1, wherein:
  the profile information further includes a user name and a user identifier, associated with the RFID information;
  the RFID gateway is connected to one or more RFID scanners; and
  the presence server is operable to obtain the profile information from the storage system comprising a Home Subscriber Server (HSS).

21. The computer program product of claim 11, wherein:
  the profile information further includes a user name and a user identifier associated with the RFID information;
  the receiving of the RFID information is from one or more RFID gateways, each of the one or more RFID gateways connected to one or more RFID scanners; and
  the presence server is operable to obtain the profile information from the storage system comprising a Home Subscriber Server (HSS).

22. The system of claim 18, wherein:
  the profile information further includes a user name and a user identifier associated with the RFID information;
  the RFID gateway is connected to one or more RFID scanners; and
  the presence server is operable to obtain the profile information from the storage system comprising a Home Subscriber Server (HSS).

* * * * *